United States Patent
Wang et al.

(10) Patent No.: US 10,309,418 B2
(45) Date of Patent: Jun. 4, 2019

(54) HIGH-TRANSMISSION-RATIO SUSPENSION SHAFT CENTRIFUGAL SUPERCHARGER WITH PLANETARY GEAR MECHANISM

(71) Applicant: HUANGSHI XYZ POWER TECHNOLOGY CO., LTD, Huangshi, Hubei (CN)

(72) Inventors: Zhifang Wang, Hubei (CN); Tao Chen, Hubei (CN)

(73) Assignee: HUANGSHI XYZ POWER TECHNOLOGY CO., LTD., Huangshi, Hubei (CN)

( * ) Notice: Subject to any disclaimer, the term of this patent is extended or adjusted under 35 U.S.C. 154(b) by 287 days.

(21) Appl. No.: 15/506,642

(22) PCT Filed: Oct. 19, 2015

(86) PCT No.: PCT/CN2015/092156
§ 371 (c)(1),
(2) Date: Feb. 24, 2017

(87) PCT Pub. No.: WO2016/062225
PCT Pub. Date: Apr. 28, 2016

(65) Prior Publication Data
US 2017/0284416 A1    Oct. 5, 2017

(30) Foreign Application Priority Data
Oct. 24, 2014    (CN) .......................... 2014 1 0580117

(51) Int. Cl.
*F02B 39/04*    (2006.01)
*F02B 33/40*    (2006.01)
(Continued)

(52) U.S. Cl.
CPC .......... *F04D 29/5806* (2013.01); *F02B 33/40* (2013.01); *F02B 39/04* (2013.01);
(Continued)

(58) Field of Classification Search
CPC .. F04D 29/5806; F04D 17/025; F04D 25/028; F04D 29/4226; F02B 33/40;
(Continued)

(56) References Cited

U.S. PATENT DOCUMENTS 5,890,468 A * 4/1999 Ozawa ................... F04D 13/06
6,634,853 B1   10/2003 Anderson
(Continued)

FOREIGN PATENT DOCUMENTS

CN    102022179    4/2011
CN    201884118    6/2011
(Continued)

OTHER PUBLICATIONS

International Search Report for international application No. PCT/CN2015/092156, dated Jan. 25, 2016 (4 pages, including English translation).

*Primary Examiner* — Syed O Hasan
(74) *Attorney, Agent, or Firm* — Hamre, Schumann, Mueller & Larson, P.C.

(57) ABSTRACT

The invention discloses a high-transmission-ratio suspension shaft centrifugal supercharger which comprises a transmission unit, a fan supercharging unit and a cooling unit; the transmission unit is composed of a belt wheel, a planetary gear mechanism, a friction wheel group and a suspension mainshaft, the planetary gear mechanism comprises a sun gear and a planetary gear both installed in a gearbox, the sun gear and the belt wheel are in coaxial installation and rotate together, the planetary gears are distributed at the periphery of the sun gear in a 120 degree symmetric way and are meshed with and follow up the sun gear; the friction wheel group comprises friction wheels arranged in a sealed box and arranged coaxially with corresponding planetary gears; the suspension mainshaft generates contact friction with surfaces of the friction wheels and is driven to rotate (Continued)

together with the friction wheels; the cooling unit is used to pump out high-temperature lubricating oil in the gearbox and the sealed box, and lubricating oil is returned after cooling is performed. According to the invention, the supercharger is substantially improved in transmission precision and speed increasing ratio at a high speed range, and also possesses characteristics of long safe life, convenience for mounting, good heat dispersion performance, low noise and the like.

5 Claims, 2 Drawing Sheets

(51) Int. Cl.
| | | |
|---|---|---|
| F04D 25/02 | (2006.01) | |
| F04D 29/58 | (2006.01) | |
| F16H 1/28 | (2006.01) | |
| F16H 1/32 | (2006.01) | |
| F04D 17/02 | (2006.01) | |
| F04D 29/42 | (2006.01) | |
| F16H 13/08 | (2006.01) | |
| F16H 37/02 | (2006.01) | |
| F16H 55/34 | (2006.01) | |
| F16H 57/08 | (2006.01) | |

(52) U.S. Cl.
CPC ......... *F04D 17/025* (2013.01); *F04D 25/028* (2013.01); *F04D 29/4226* (2013.01); *F16H 1/28* (2013.01); *F16H 1/32* (2013.01); *F16H 13/08* (2013.01); *F16H 37/02* (2013.01); *F16H 55/34* (2013.01); *F16H 57/08* (2013.01)

(58) Field of Classification Search
CPC ... F02B 39/04; F16H 1/28; F16H 1/32; F16H 13/08; F16H 37/02; F16H 55/34; F16H 57/08
See application file for complete search history.

(56) References Cited

U.S. PATENT DOCUMENTS

| | | | |
|---|---|---|---|
| 2004/0237949 A1* | 12/2004 | Yasui et al. | F02B 33/00 |
| 2012/0269653 A1* | 10/2012 | Lutoslawski et al. | F02B 39/06 |
| 2015/0330295 A1* | 11/2015 | Walls et al. | F02B 67/06 |

FOREIGN PATENT DOCUMENTS

| | | |
|---|---|---|
| CN | 102536440 | 7/2012 |
| CN | 104454145 | 3/2015 |
| CN | 204186466 | 3/2015 |
| GB | 2317937 | 4/1998 |

* cited by examiner

HIGH-TRANSMISSION-RATIO SUSPENSION SHAFT CENTRIFUGAL SUPERCHARGER WITH PLANETARY GEAR MECHANISM

FIELD OF THE INVENTION

The invention belongs to the technical field of related accessories of explosive motors, and more particularly relates to a high-transmission-ratio suspension shaft centrifugal supercharger with a planetary gear mechanism.

BACKGROUND OF THE INVENTION

An explosive motor is usually provided with a supercharger for compressing air before air enters a cylinder so as to improve efficiency and output power, and accordingly more air is sucked for combusting more fuel under the condition of a same cylinder volume, thereby facilitating the purpose of increasing the power.

Conventional engine superchargers in general use employ mechanical supercharging, turbocharging and the like. Mechanical supercharging comprises centrifugal mechanical supercharging, spiral supercharging, Roots supercharging and the like, possesses advantages of work reliability, good linear following feature and excellent performances when an engine operates at a low speed and the like because the engine is directly used for driving a supercharger and further high-density air is sent into a cylinder for improving output power of the engine. However mechanical supercharging has the disadvantages that supercharging effect is not ideal, noise is relatively large at a high-speed stage, and the like.

An application CN201010593788.3 "friction wheel high-speed suspension shaft centrifugal supercharger" applied in 2010 by the same inventor, solves the problems that a conventional mechanical supercharger is large in volume and low in efficiency and the rotation speed is difficult to improve, and possesses advantages of simple structure, preparation easiness and the like by researching and designing a novel suspension mainshaft and a matched friction wheel structure. However, through engineering application in subsequent several years and actual tests, the centrifugal supercharger still has the following defects or disadvantages: 1) the centrifugal supercharger employs three belt wheels for respectively transmitting engine power to friction wheels as first-order transmission, but once a part of one belt wheel is unstressed during loading, empty load is formed between the belt wheel and the friction wheel, and may cause increase of the sliding ratio of a central shaft and reduction of the transfer efficiency; 2) since a plurality of belt wheels are demanded for executing transmission, the loading orientation is greatly limited when the belt wheels are installed on an automobile engine, and therefore it is difficult to design and install the belt wheels during actual operation; 3) the friction wheel in the centrifugal supercharger, as one of main core components, is composed of a wheel center, a rubber ring, a steel wheel sleeve and a magnetic ring, and a bench test proves that the rubber ring generates difficultly-recovered deformation or even is broken and causes periodic slip between the friction wheel and a center shaft or failure of the whole supercharging system because of high-frequency stress resistance and drawing force after the friction wheel runs for a relatively long period since the rubber bears rotation pressure and circumferential drawing force during rotation in a bench test, which are especially obvious after the rotation speed is improved; and 4) at present a fan is employed for cooling the friction wheel, which is suitable when the transmission efficiency of the supercharger is low or middle, but after the transmission efficiency is improved to a relatively high degree, the cooling effect is limited and is guaranteed only by improving the power of the fan, and accordingly the load of the whole machine is improved and the system noise is substantially increased.

SUMMARY OF THE INVENTION

In view of the above-mentioned defects in the prior art or improvement demand, it is an objective of the invention to provide a high-transmission-ratio suspension shaft centrifugal supercharger with a planetary gear mechanism, which is capable of improving the power and the torque of an engine and also substantially improving the transmission precision and the speed increasing ratio of the whole machine after the machine operates at a high-speed stage by improving the whole integral construction, the working transmission process and concrete structures and setting ways of multiple key components such as the transmission unit, the friction wheels and the cooling unit, also possesses characteristics of long safe life, convenience to load and install, good heat dispersion, low noise and the like, and accordingly is especially applicable to various small-displacement family cars and agricultural automobiles.

In order to realize the above purposes, the invention provides the high-transmission-ratio suspension shaft centrifugal supercharger with a planetary gear mechanism, and the supercharger comprises a transmission unit, a fan supercharging unit and a cooling unit;

the transmission unit is composed of a belt wheel, a planetary gear mechanism, a friction wheel group and a suspension mainshaft, the belt wheel is directly connected to and driven by an automobile engine via a transmission belt; the planetary gear mechanism comprises a sun gear and three planetary gears together arranged in a gearbox, the sun gear penetrates the gearbox, is coaxially installed with the belt wheel and rotates together with the belt wheel, the three planetary gears are distributed at periphery of the sun gear respectively via transmission shafts in a symmetric manner, and are all meshed with and follow up the sun gear; the friction wheel group comprises three groups of friction wheels together arranged in a sealed box, the three groups of friction wheels, corresponding to the planetary gears, are coaxially arranged respectively on the transmission shafts and are divided into front friction wheels at a first same plane and rear friction wheels at a second same plane; a front end and a rear end of the suspension mainshaft generate contact friction respectively with surfaces of the front friction wheels and the rear friction wheels, and the suspension mainshaft is lifted up by taking outer diameters of six friction rings formed by the three groups of friction wheels at a 120-degree interval as support points, and accordingly is driven to rotate together with the friction wheels; additionally, the gearbox is connected to the sealed box as a whole, and internal cavities of the gearbox and the sealed box are in communication and are injected with lubricating oil (for example, light lubricating oil);

the fan supercharging unit comprises a casing, an axial air inlet and a radial air outlet arranged on the casing, and a centrifugal impeller group and an axial impeller group arranged in the casing, the centrifugal impeller group and the axial impeller group are successively fixedly sleeved on the tail end of the suspension mainshaft, rotate under driving of the suspension mainshaft, and accelerate an airflow to the radial air outlet from the axial air inlet, thereby giving play to supercharging effect; and the cooling unit comprises a gear pump and an oil cooler, wherein the gear pump is installed in the gearbox and used for pumping out lubricating oil heated because of rotation of the sun gear, the planetary gear, the friction wheel and the suspension mainshaft to the oil cooler, and the oil cooler cools lubricating oil and returns lubricating oil to the sealed box. Or an electric pump can be added to the loop cooling the lubricating oil so as to facilitate circular flow of the lubricating oil.

Through the above conception, by employing the planetary gear mechanism for constructing the transmission system, empty load is effectively avoided and precision and efficiency of the whole transmission system are further improved, and especially one order of speed increase can be added on an original basis, thereby forming a three-order speed increasing system comprising belt wheel-sun gear speed increase, sun gear-satellite gear speed increase and friction wheel-suspension mainshaft speed increase, substantially improving the current insufficient situation of the speed increasing ratio and bringing still satisfied supercharging effect after the system operates at a high-speed stage. Also, since the system no longer needs a plurality of belt wheels, the linkage between the belt wheel and the engine power part is realized by enabling a gear shaft of the sun gear to penetrate the gearbox and installing the transmission belt on the shaft, and correspondingly there is not the problem that the installation loading orientation is difficult to design, and meanwhile the problem that the rotation speed of the friction wheel is bad is solved. Additionally, through integrated design of the gearbox and the sealed box, good lubrication is provided for contact between shafts and gears and between wheels and gears, also enough cooling effect is provided. Actual tests show that the integral performance of the supercharger is substantially improved compared with that of the previous generation product, the highest rotation speed of the mainshaft is improved from 72000 r/min to more than 100000 r/min, the continuous working time is improved from original 1000 h to more than 3000 h through a bench continuous speed-changing test, and also the friction noise of the whole machine is obviously reduced.

Further preferably, each of the friction wheels comprises a wheel center, an elastic rubber ring and a wheel sleeve successively from inside to outside, the wheel center is sleeved on the transmission shaft at the central position of the wheel center, and is provided with a plurality of first gears protruding outwards and symmetrically distributed along the peripheral direction on the outer surface; the internal surface of the elastic rubber ring is provided with a plurality of inner gear slots matched with the first gears, and therefore the elastic rubber ring is installed on the wheel center in an inlaying way; the wheel sleeve is provided with a plurality of second gears protruding inwards and distributed along the peripheral direction on the internal surface, and the outer surface of the elastic rubber ring also is provided with a plurality of outer gear slots matched with the second gears, and therefore the elastic rubber ring is installed on the wheel sleeve in an inlaying way; and additionally, the first gears and the second gears have a same structure and are mutually staggered and symmetrically distributed.

After each of the friction wheels is assembled according to the above designed concrete structure, the elastic rubber ring possesses an expansion force, and through design of the inner and outer gear slots, precise cooperation between the elastic rubber ring and the wheel center and between the elastic rubber ring and the wheel sleeve is further guaranteed, as well as the transmission precision. During rotation, the first gears push the elastic rubber ring, and then the outer gear slots of the elastic rubber ring drive the second gears, so that the friction wheel continuously steadily rotates along the transmission shaft, mainly only bears the radial circumferential extrusion force and is basically not influenced by a drawing force in the whole rotation process, and accordingly, even extremely high-speed operation (for example, 90000 r/min) happens, periodic slip between a center shaft and the friction wheel or failure of the whole supercharging system does not happen, and also the structure stability and the working life are substantially improved, which are especially significant when high-speed rotation is demanded.

Further preferably, a gear number ratio of the sun gear to the planetary gear is preferably set as 1:1.5, and a diameter ratio of the friction wheel to the suspension mainshaft is set as 1:4.456, and a total transmission ratio is 6.68.

Under the circumstance that three-order speed increasing transmission is employed, main specification parameters of the transmission system play a same important role in finally obtaining the supercharging effect, and therefore the specification of the gears, the friction wheels and other elements is defined as the above specific parameters, when the belt wheel makes one rotation, the suspension mainshaft is driven to make 6.68 rotations, and meanwhile the rotation speed of the fan impeller group is improved by 6.68 times. Many comparison tests show that the speed increasing ratio can help to provide an ideal supercharging effect at a high-speed stage while guaranteeing reliability and transmission efficiency of long-time continuous working.

Further preferably, the gear pump is replaced by an oil pump and is installed outside the gearbox.

Further preferably, the wheel center is preferably an aluminium alloy wheel center, the elastic rubber ring is made from hydrogenated nitrile and other materials with a large temperature coefficient span, and the wheel sleeve is preferably prepared from bearing steel.

To summarize, the present invention comprises the following advantages over the prior art:

1, by researching and designing components of the transmission system and structure and setting ways of the components, three-order incentive is obtained, the empty load phenomenon of a conventional supercharger is overcome, and also the bottleneck problems of gain ratio and transmission efficiency are effectively solved; and tests show that the highest rotation speed of the transmission system can reach 100000 r/min or more, loading installation of the transmission system and an automobile engine is convenient, and especially the supercharging effect at a high-speed stage is substantially improved.

2, by improving the concrete structure of the friction wheel, a magnetic ring with relatively high cost is saved and the manufacture difficulty is reduced; and additionally, the friction wheel can give play to good supporting and transmission effects without generating periodic slip and breakage problems during a long service life, thereby improving the rotation precision of the transmission system as well as the reliability and service life.

3, tests show that good lubrication effect and enough cooling effect are provided through matched design of the gear box, the sealed box and the cooling unit, and a bench continuous speed-changing measurement result show that the continuous working time is improved from 1000 h of the previous generation product to 3000 h or more; and through the integral design, a compact reasonable installation framework is provided and the friction noise of the whole machine is obviously reduced.

4, the suspension shaft centrifugal supercharger according to the invention is compact in integral structure, convenient to adjust and install and high in transmission ratio, and also is safe and reliable after being used for a long time, the noise of the integral machine is low, and an ideal supercharging effect can be provided even at a high-speed stage, and therefore the suspension shaft centrifugal supercharger is applicable to small-displacement automobiles, especially automobiles with the displacement of 1.0 L-2.0 L (for example, 1.2 L or 1.6 L), and various family cars or agricultural automobiles used at plateaus, mountainous areas and other application places through mounting and matching.

DESCRIPTION OF ACCOMPANYING DRAWINGS

In all accompany drawings, same reference numbers represent same elements or structures, in which, 1—transmission unit, 2—fan supercharging unit, 11—belt wheel, 12—planetary gear mechanism, 13—friction wheel group, 14—suspension mainshaft, 21—casing, 22—axial air inlet, 23—radial air outlet, 24—centrifugal impeller group, 25—axial impeller group, 201—sun gear, 202—planetary gear, 203—gearbox, 204—transmission shaft, 131—sealed box, 132—friction wheel, 1321—wheel center, 1322—elastic rubber ring, and 1323—wheel sleeve.

SPECIFIC EMBODIMENT OF THE INVENTION

For clear understanding of the objectives, technical scheme and advantages of the invention, detailed description of the invention will be given below in conjunction with accompanying drawings and specific embodiments. It should be noted that the embodiments are only meant to explain the invention, and not to limit the scope of the invention. Additionally, technical features referred by embodiments described below may be mutually combined as long as they do not conflict.

Figure 1:
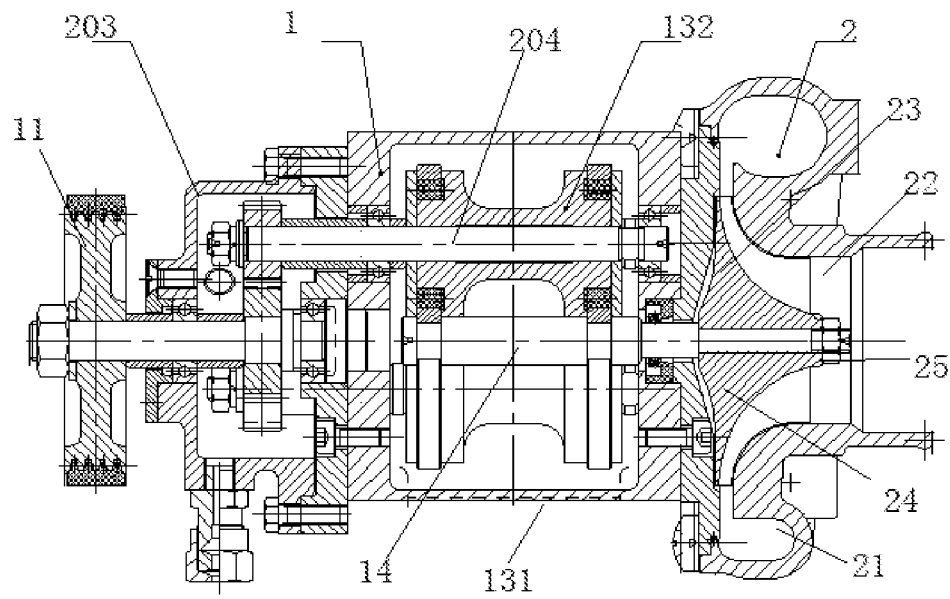
FIG. 1 illustrates the integral structure and the configuration of a centrifugal supercharger according to an exemplary embodiment of the invention.

FIG. 1 illustrates the integral structure and the setting way of a centrifugal supercharger constructed according to the invention. As illustrated in FIG. 1, the centrifugal supercharger mainly comprises a transmission unit 1, a fan supercharging unit 2, a cooling unit 3 and other functional units. Aiming at various disadvantages of conventional mechanical superchargers, the invention performs research design on structures and setting ways of the functional units by referring engineering application practice and bench test results (particularly described in background) of previous products of the inventor, so as to facilitate purposes of improving the speed increasing ratio of a complete machine, guaranteeing the supercharging effect at a high-speed stage, reducing noise, improving integral performances and reliability for long-term use and the like.

Figure 2:
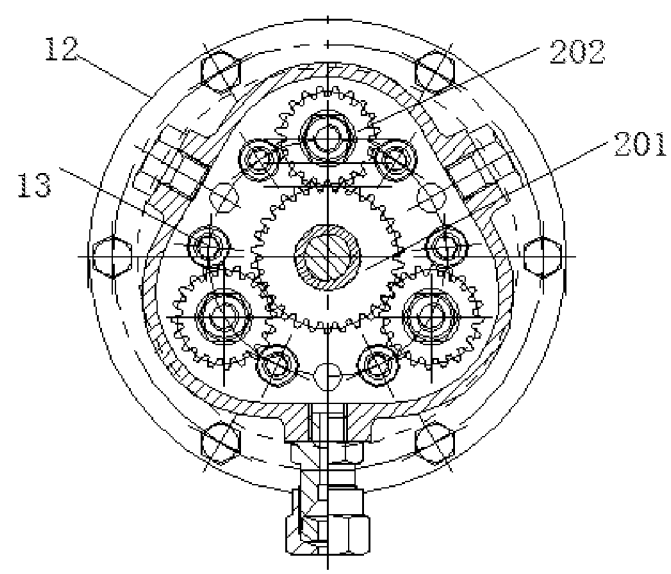
FIG. 2 is an end view of the structure of the transmission system illustrated in FIG. 1.
Figure 4:
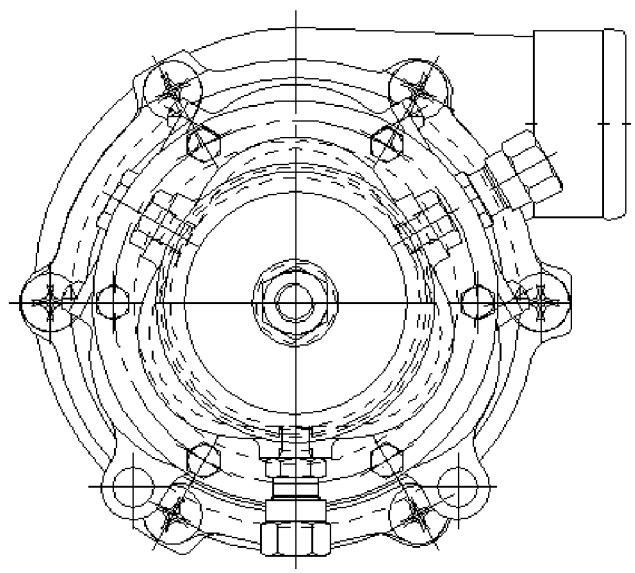
FIG. 4 illustrates a transmission process between a suspension shaft and the friction wheel.

Concretely, as illustrated in FIG. 1 and FIG. 2, the transmission unit 1 is composed of a belt wheel 11, a planetary gear mechanism 12, a friction wheel group 13 and a suspension mainshaft 14. The belt wheel 11, for example, is directly connected to a power part of an automobile engine via a transmission belt for power drive. As a key improvement, the planetary gear mechanism 2 comprises a sun gear 201 and three planetary gears 202 together arranged in a gearbox 203, the sun gear 201 has a relatively large diameter, and one end (shown as the left end in FIG. 1) of the sun gear 201 directly penetrates the gearbox 203 and is coaxially installed at a transmission shaft with the belt wheel 11 and rotates together with the belt wheel 11. The three planetary gears 202 have a same structure and a relatively small diameter, are symmetrically arranged at the periphery of the sun gear 201 respectively via transmission shafts 204 and matched planet carriers, and are all meshed with the sun gear 201, and therefore when rotating, the large gear drives the three small gears meshed therewith to synchronously rotate. As an example, the friction wheel groups 13 are divided into three groups, each group comprises two friction wheels respectively arranged at a front position and a rear position (of course, it is acceptable if each group contains more friction wheels, and based on consideration of balance between transmission efficiency and structure compactness, the form of double friction wheels in tandem is selected, and additionally, the friction wheels are preferably distributed radially at a suspension shaft at a 120-degree interval), all friction wheels 32 of the friction wheel groups 13 are all arranged in a sealed box 131, namely in a friction wheel box, and each group of friction wheels is coaxially arranged on a transmission shaft 204 together with a corresponding planetary gear, so that when the planetary gear rotates, the planetary gear drives the group of friction wheels fixedly disposed on the same shaft to synchronously rotate. Furthermore, as illustrated in FIG. 4, the friction wheels, at the front end of the transmission shaft, in the three groups of friction wheels are kept at a same plane, so that the motion trajectory are at a same plane when the friction wheels rotate, and preferably the line of center points of the three front friction wheels form an equilateral triangle, and edges of the three friction wheels together support the front end of the suspension mainshaft as three support points, and drive the suspension mainshaft to rotate through friction contact. The friction wheels, at the rear end of the transmission shaft, in the three groups of friction wheels are kept at another same plane and support the rear end of the suspension mainshaft in the above mentioned same manner, and therefore the rear friction wheels and the front friction wheels act together for executing transmission. Since the front end and the rear end of the suspension mainshaft 14 generate contact friction respectively with surfaces of the three front friction wheels and the three rear friction wheels, synchronous high-speed rotation can be performed even under a bearing-free circumstance.

Through the above manner, since the transmission system does not need three belt wheels any longer, the problems of empty load between belt wheels and friction wheels and a high sliding ratio are effectively solved, and also installation of the belt wheel to the automobile engine is facilitated, which is very critical for equipment upgrading of various automobiles and expansion of product applicability. Especially, by increasing one order of speed increase in the gearbox, the integral speed increasing ratio is obviously improved compared with an original speed increasing ratio. Based on an example that the gear ratio of the sun gear to the planetary gear is 1:1.5 and the preferable diameter ratio of the friction wheel to the suspension mainshaft is 1:4.456, the rotation speed ratio of the supercharger is 6.68, and the speed increasing ratio from a belt pulley of a main shaft of the engine to a belt pulley of the supercharger is 1:2.5, and therefore, the total transmission ratio is 16.7, that is, the belt wheel, which makes one rotation, drives the suspension mainshaft to make 6.68 rotations, and the rotation speed of the fan impeller group installed on the suspension mainshaft is improved by 16.7 times at the same time, and therefore the speed increase of a wind flow blown from the fan supercharging unit is further increased, the pressure is raised and wind flow is increased, thereby greatly improving work efficiency and supercharging effect.

The fan supercharging unit 2 comprises a casing, an axial air inlet 22 and an radial air outlet 23 arranged on the casing 21, and a centrifugal impeller group 24 and an axial impeller group 25 arranged in the casing 21. Additionally, the fan supercharging unit 2 can comprise structures such as an axial duct, an impeller chamber, a shelf and the like. The centrifugal impeller group 25 and the axial impeller group 24 are successively fixedly sleeved on the tail end (shown as a right end in FIG. 1) of said suspension mainshaft 14, and accordingly rotate synchronously under driving of the suspension mainshaft, and accelerate an airflow to the radial air outlet 23 from the axial air inlet 22, thereby giving play to supercharging effect; and As another key improvement of the invention, the gearbox 203 is connected to the sealed box 131 as a whole, internal cavities of the gearbox 203 and the sealed box 131 are in communication and are injected with lubricating oil; and on the above basis, the invention also is provided with the cooling unit for cooling and temperature decrease. The cooling unit comprises a gear pump and an oil cooler, the gear pump is formed directly by some gears in the gearbox, and is used to pump out lubricating oil heated because of high-speed rotation between the sun gear 201, the planetary gear 202, the friction wheel 132 and the suspension mainshaft 14, and the lubricating oil is sent to the oil cooler for cooling and then returns to the sealed box 131. Additionally, the gear pump can operate to replace an external electric oil pump, thereby further reducing equipment volume and improving structure compactness.

The reason for the above design comprises that increase of fan power brings very limited cooling effect and rapidly deteriorates system noise status although it is practicable to employ lubricating grease or a fan for cooling in the prior art under the condition of low- and medium-speed rotation since friction force in the transmission unit directly influences the load capacity and the transmission efficiency of the complete machine. By designing the friction wheel box as a sealed box, enabling the friction wheel box and the gear box to be integrally combined and injecting lubricating oil into the communicated cavities, enough lubrication is provided for multiple gears, the friction wheels, the transmission shafts, a bearing and the suspension mainshaft, and also good cooling effect is provided under the premise of no increase in noise. Through the above integral mechanical design, the rotation speed of the centrifugal supercharger mainshaft of the invention has the maximum value improved from previous 72000 r/min to more than 100000 r/min, and results of the bench continuous speed-changing test show that the continuous working time is improved from 1000 h of a previous generation product to 3000 h or more, and therefore the centrifugal supercharger of the invention has greater practical application value.

Figure 3:
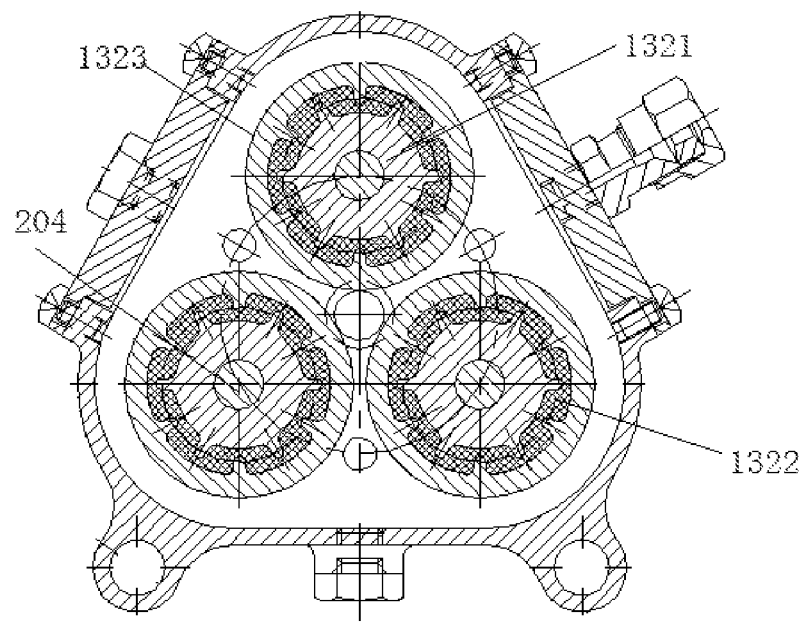
FIG. 3 is a section view of the structure of the transmission system illustrated in FIG. 1.

FIG. 3 is a section view of the structure of the novel friction wheel designed according to the invention. As another key improvement of the invention, the friction wheel plays an important role in improving the maximum rotation speed, guaranteeing rotation precision, guaranteeing reliability of long-term operation and the like.

Concretely, each friction wheel 132 comprises a wheel center 1321 (of an aluminium wheel, for example), an elastic rubber ring 1322 and a wheel sleeve 1323 successively from inside to outside, the wheel center is sleeved on a corresponding transmission shaft 204 at the central position of the wheel center, and is provided with a plurality of first gears protruding outwards and symmetrically distributed along the peripheral direction on the outer surface; the internal surface of said elastic rubber ring 1322 is provided with a plurality of inner gear slots matched with said first gears, and therefore the elastic rubber ring 1322 is installed on the wheel center 1321 in a tight inlaying way; the wheel sleeve 1323 is provided with a plurality of second gears protruding inwards and distributed along the peripheral direction on the internal surface, and the outer surface of the elastic rubber ring 1322 also is provided with a plurality of outer gear slots matched with the second gears, and therefore the elastic rubber ring 1322 is installed on the wheel sleeve 1323 in an inlaying way; and additionally, the first gears and the second gears have a same structure and are mutually staggered and symmetrically distributed.

After each of the friction wheels is assembled according to the above designed concrete structure, the elastic rubber ring possesses an expansion force, and also inner and outer gear slots, in which the first gears and the second gears are respectively inlayed, are provided, and therefore precise cooperation between the wheel center and the wheel sleeve is further guaranteed, as well as the transmission precision. When the aluminium wheel rotates, the gears of the aluminium wheel pushes the rubber components, the rubber components gear slots drive the rubber rings, and the rubber rings drive the center shaft to rotate, and at the moment the rubber components mainly only bear radial circumferential extrusion force and are basically not subjected to pulling force, so the service life of the rubber components is prolonged, and more important, the peak value of the rotation speed of the friction wheels is further improved, and periodic slip between the center shaft and the friction wheels or failure of the whole supercharging system does not happen even when the system operates at an extremely high speed.

To summarize, the suspension shaft centrifugal supercharger with the planetary gear mechanism according to the invention is capable of improving the power and the torque of an engine and also substantially improving the transmission precision and the speed increasing ratio of the whole machine after the machine operates at a high-speed stage, also possesses characteristics of long safe life, convenience to load and install, good heat dispersion, low noise and the like, and accordingly is especially applicable to engines of various crankshaft connecting rod systems and family cars, agricultural automobiles and other vehicles with the displacement of, for example, 1.4 L and 1.6 L, and gives play to effects of improving power, increasing torque and reducing emission.

While preferred embodiments of the invention have been described above, the invention is not limited to disclosure in the embodiments and the accompanying drawings. Any changes or modifications without departing from the spirit and the principle of the invention fall within the scope of the invention.

What is claimed is:

1. A high-transmission-ratio suspension shaft centrifugal supercharger with a planetary gear mechanism, said supercharger comprising a transmission unit, a fan supercharging unit and a cooling unit, wherein, said transmission unit is composed of a belt wheel, a planetary gear mechanism, a friction wheel group and a suspension mainshaft, said belt wheel is directly connected to and driven by an automobile engine via a transmission belt; said planetary gear mechanism comprises a sun gear and three planetary gears together arranged in a gearbox, said sun gear penetrates said gearbox, is coaxially installed with said belt wheel and rotates together with said belt wheel, said three planetary gears are distributed at periphery of said sun gear respectively via transmission shafts in a 120 degree symmetric interval, and are all meshed with and follow up said sun gear; said friction wheel group comprises three groups of friction wheels together arranged in a sealed box, said three groups of friction wheels, corresponding to said planetary gears, are coaxially arranged respectively on said transmission shafts and are divided into front friction wheels at a first same plane and rear friction wheels at a second same plane; a front end and a rear end of said suspension mainshaft generate contact friction respectively with surfaces of said front friction wheels and said rear friction wheels, and said suspension mainshaft is lifted up by taking outer diameters of six friction rings formed by said three groups of friction wheels distributed at a 120-degree interval as support points, and accordingly is driven to rotate together with said friction wheels; additionally, said gearbox is connected to said sealed box as a whole, and internal cavities of said gearbox and said sealed box are in communication and are injected with lubricating oil; said fan supercharging unit comprises a casing, an axial air inlet and a radial air outlet arranged on said casing, a centrifugal impeller group and an axial impeller group arranged in said casing, said centrifugal impeller group and said axial impeller group are successively fixedly sleeved on the tail end of said suspension mainshaft, rotate under driving of said suspension mainshaft, and accelerate an airflow to said radial air outlet from said axial air inlet, forming a supercharging effect; and said cooling unit comprises a gear pump and an oil cooler, wherein said gear pump is installed in said gearbox and used for pumping out lubricating oil heated because of rotation of said sun gear, said planetary gear, said friction wheels and said suspension mainshaft to said oil cooler, and said oil cooler cools lubricating oil and returns lubricating oil to said sealed box.

2. The suspension shaft centrifugal supercharger according to claim 1, wherein each of said friction wheels comprises a wheel center, an elastic rubber ring and a wheel sleeve successively from inside to outside, said wheel center is sleeved on said transmission shaft at the central position of said wheel center, and is provided with a plurality of first gears protruding outwards and symmetrically distributed along the peripheral direction on the outer surface; the internal surface of said elastic rubber ring is provided with a plurality of inner gear slots matched with said first gears, and therefore said elastic rubber ring is installed on said wheel center in an inlaying configuration; said wheel sleeve is provided with a plurality of second gears protruding inwards and distributed along the peripheral direction on the internal surface, and the outer surface of said elastic rubber ring also is provided with a plurality of outer gear slots matched with said second gears, and therefore said elastic rubber ring is installed on said wheel sleeve in an inlaying configuration; and additionally, said first gears and said second gears are mutually staggered and symmetrically distributed.

3. The suspension shaft centrifugal supercharger according to claim 1, wherein a gear number ratio of said sun gear to said planetary gears is preferably set as 1:1.5, and a diameter ratio of said friction wheels to said suspension mainshaft is set as 1:4.456, and a total transmission ratio is 6.68.

4. The suspension shaft centrifugal supercharger according to claim 1, wherein said gear pump is replaced by an electric oil pump and is installed outside said gearbox.

5. The suspension shaft centrifugal supercharger according to claim 1, wherein said wheel center is preferably an aluminium alloy wheel center, said elastic rubber ring is made from hydrogenated nitrile and other materials with a large temperature coefficient span and a small pressure change, and said wheel sleeve is preferably prepared from bearing steel.

* * * * *